United States Patent [19]

Farnham

[11] 4,452,761

[45] Jun. 5, 1984

[54] METHOD AND APPARATUS FOR RESTRAINING LIFTING OF RADIAL REACTOR CENTERPIPES

[75] Inventor: Robert A. Farnham, San Rafael, Calif.

[73] Assignee: Chevron Research Company, San Francisco, Calif.

[21] Appl. No.: 403,527

[22] Filed: Jul. 30, 1982

[51] Int. Cl.³ .......................... B01J 8/02; B01J 35/02
[52] U.S. Cl. ................................. 422/218; 208/146; 285/24
[58] Field of Search ............... 422/218, 220, 222, 232, 422/233, 310, 311, 216; 208/146; 285/18, 24, 31, 32, 397, 403

[56] References Cited

U.S. PATENT DOCUMENTS

| | | | |
|---|---|---|---|
| 2,916,361 | 12/1959 | Lewis et al. | 208/146 X |
| 2,997,374 | 8/1961 | Lavender, Jr. et al. | 208/146 X |
| 3,027,244 | 3/1962 | Byrne et al. | 208/146 X |
| 3,051,561 | 8/1962 | Grimes | 208/146 X |
| 3,652,231 | 3/1972 | Greenwood et al. | 422/216 X |
| 4,033,727 | 7/1977 | Vautrain | 208/146 X |
| 4,244,922 | 1/1981 | Burke et al. | 208/146 X |
| 4,276,265 | 6/1981 | Gillespie | 422/311 |
| 4,374,095 | 2/1983 | Legg et al. | 208/146 X |

FOREIGN PATENT DOCUMENTS 140006 2/1980 Fed. Rep. of Germany ...... 422/218

Primary Examiner—Richard L. Chiesa
Attorney, Agent, or Firm—Burns, Doane, Swecker & Mathis

[57] ABSTRACT

In a radial flow catalytic reactor, a centerpipe is gravity supported in a central socket member and restrained as to vertical upward movement within a predetermined maximum distance to prevent unseating of the centerpipe due to thermal cycling of the catalyst and/or the reactor internal members.

Such vertical movement of the centerpipe is restrained by means, such as one or more rods, interposed between the top of the centerpipe and an upper portion of the vessel. Similarly, restraining rods may be used to confine vertical movement of the screen segments enclosing the catalyst bed.

Additionally, the centerpipe may include a perforated pipe enclosed within a cylindrical screen member forming a major portion of the centerpipe. The pipe is independently seated in the central socket member so it may expand and contract independently of catalyst action on the centerpipe screen section.

15 Claims, 4 Drawing Figures

METHOD AND APPARATUS FOR RESTRAINING LIFTING OF RADIAL REACTOR CENTERPIPES

FIELD OF THE INVENTION

This invention relates to radial flow catalytic reactors. More particularly it relates to a method of and apparatus for operating a radial flow reactor to restrain vertical movement of a gravity supported, uniformly permeable centerpipe due to changes of temperature of the centerpipe, fluids, catalyst and/or portions of the vessel structure during heating and cooling of such catalytic reactors.

DESCRIPTION OF THE PRIOR ART

It is a particular object of the invention to restrain vertical movement of a gravity supported centerpipe in a radial flow catalytic reactor due to thermal cycling. Such restraint limits the distance that the centerpipe can lift from a socket base and thereby prevents loss of catalyst through the socket or reacting fluids, bypassing the catalyst bed through the top of the centerpipe.

In general, the "internals" of such radial flow reactors are gravity supported in a vertically elongated vessel and all such internals are inserted and removed through an enlarged opening, such as a manway, in the upper wall of the vessel. ("Internals" as used herein refers to the centerpipe, catalyst particles, and catalyst retaining screens forming the catalyst bed and providing annular space between the outer circumference of the bed and the reactor vessel sidewall including any insulating structure.) Where such a radial flow reactor operates at elevated temperatures, it is frequently desirable to insulate the interior wall of the vessel so that the outer steel wall operates near ambient temperature conditions. To avoid heat conduction from the vessel internals to the vessel walls, all such internals must be essentially gravity supported except for a few low thermal conductivity paths (e.g., thin web supports and the like), which may be welded to a vessel nozzle or entry pipe in the bottom wall of the vessel. Further, the depth of the socket support for the centerpipe is as short as possible while still permiting use of the full vertical height of the reactor for radial flow through the catalyst bed.

Additionally, where radial reactors are used for hydroprocessing hydrocarbons, hydrogen is used to influence cracking, isomerization or reforming of such hydrocarbons. To contain the hydrogen and prevent hydrogen embrittlement of the steel vessel walls (due to hydrogen interaction with carbon in the steel) it is usually necessary to heat treat such reactor vessels (frequently 60 to 100 feet long and up to 30 feet in diameter) as a single unit. After such heat treatment it is undesirable to affix, as by welding, any portion of the internals to that vessel. For this additional reason, such catalyst retaining members are gravity supported in the vessel.

In radial flow reactors, fluid reactant generally enters the top of the vessel, flows downwardly in the annular space between the outer retaining screens and the wall, and then passes radially inward through the bed to a perforated centerpipe. Fluid in the centerpipe then leaves through an outlet at the bottom of the vessel. Alternatively, flow into the vessel may be inverted so that reactant enters the bottom periphery of the vessel, flows upwardly in the annular space between the vessel wall and catalyst bed, passes through the bed and leaves through a centerpipe communicating with a central lower outlet. Reverse flow is also possible. In such an arrangement, inlet flow of reactant fluids is upwardly in the centerpipe, radially outward through the catalyst bed and out of the top of the vessel.

As mentioned above, conventional radial reactors are usually subjected to temperature cycling, an alternate increase and decrease in the temperature of the vessel and its contents. The cycles are frequently from 200° to 500° C. or more in magnitude. Temperature cycling occurs, for instance, when an apparatus is heated and brought into service at an elevated operating temperature and subsequently withdrawn from service and cooled. Temperature cycling also occurs when contact material in the vessel is regenerated at an elevated temperature, or when there is a change in feed rate or a power outage. Apparatus employed in catalytic hydrocarbon conversion processes such as reforming, isomerization, hydrodesulfurization and hydrocracking are especially subject to temperature cycling. Because radial flow vessels of conventional design have such removable vertical members, the centerpipes, or contact material retaining screens, or both, tend to move vertically upward relative to the bed of catalyst material with each temperature cycle.

The reasons for such net upward movement of a centerpipe or retaining screens, or both, are not completely understood. Apparently, the centerpipe and retaining screens, upon being heated, expand in an upward direction. But upon being cooled, they contract from both ends toward a center neutral point. Thus, with each cycle, there is a net upward movement, frequently up to 1 centimeter or more. Eventually the centerpipe may rise enough from its mounting socket, or seat, to allow unwanted movement of the contact material. If the centerpipe moves away from its seat at the base of the vessel, contact material will flow under it, escape from the vessel and enter subsequent vessels such as heat exchangers. There, the contact material can adversely affect fluid flow distribution or contacting efficiency, or shut down flow completely. Upward movement of a retaining screen around the periphera of the catalyst bed may lead to a drop in the level of contact material as the contact material fills the space under the screen between the screen and the vessel wall. Shifting of the catalyst changes flow of the reactant at the bottom of the vessel which can cause local hot spots, coking and eventual damage to the reactor walls. The effect of a drop in catalyst level by either a screen lift or a rise of the centerpipe, is to decrease the depth of the contact material seal above the upper permeable portion of the centerpipe. Such a decreased seal may allow some of the feed to bypass the contact material, which may lead to loss of product quality.

One arrangement for restraining centerpipe movement is shown and described in U.S Pat. No. 4,244,922, issued Jan. 13, 1981, assigned to the assignee of this application. In that patent a horizontal surface is secured to the centerpipe in such a position that it carries a portion of the weight of the catalyst bed. The horizontal surface is in the form of a disk which either is secured to the pipe or rests upon a flange affixed to the centerpipe. This arrangement is quite satisfactory to prevent centerpipe vertical movement but presents some problems. If the flange is permanently fixed to the centerpipe, as by welding, the increased diameter interferes with insertion and removal of the pipe through the vessel manway. Further it may interfere with visual alignment and landing of the base of the centerpipe in the vessel support socket.

U.S. Pat. No. 4,033,727—Vautrain, issued July 5, 1977; U.S. Pat. No. 3,167,399—Hansen, issued Jan. 26, 1965 and U.S. Pat. No. 3,027,244—Byrne et al, issued Mar. 27, 1962, each discloses radial flow reactors having uniform diameter centerpipes which appear to be gravity supported on the bottom wall of the vessel, but without means for preventing upward movement of the centerpipe sufficient to prevent unseating and catalyst loss from the vessel.

U.S. Pat. No. 2,997,374—Lavender et al, issued Aug. 22, 1961 discloses a radial flow reactor in which the centerpipe is permanently secured to the bottom wall of the reactor vessel.

U.S. Pat. No. 2,635,989—Bonner, issued Apr. 21, 1953 discloses a radial flow reactor in which the centerpipe enters either the top or bottom of the reactor and is composed of a vertical series of cones or cylinders of decreasing diameter from the inlet to the outlet end of the vessel. The centerpipe is permanently affixed to the end wall of the reactor vessel.

In my prior U.S. Pat. application Ser. No. 316,522 filed Oct. 29, 1981, now U.S. Pat. No. 4,374,094 which is assigned to the assignee of the present invention, there is disclosed method and apparatus for preventing centerpipe lifting by forming the centerpipe with a uniformly permeable frustroconical configuration. The structure is preferrably a gravity seated rigid screen member against which the weight of the catalyst particles bear to resist pipe lift.

Application Ser. No. 316,547, also filed on Oct. 29, 1981, now U.S. Pat. No. 4,374,095, and also assigned to the assignee of the present invention, discloses an alternate form of a frustroconically configured centerpipe in which an internal pipe is slotted or drilled and openings through the pipe are surrounded by screen means.

SUMMARY OF THE INVENTION

In accordance with the present invention uniform radial flow through the catalyst bed is through a cylindrical centerpipe which is supported in a socket and restrained from vertical movement due to thermal cycling which would unseat the centerpipe from its socket. Such lifting tendency of the centerpipe is also reduced by forming it with uniform radial and longitudinal permeability as in a generally rigid screen. The centerpipe is restrained within a predetermined maximum distance by restraint means, such as rods, interposed between the top of the centerpipe and an upper portion of the vessel, such as the upper end wall.

Preferably, the centerpipe is formed by uniformly permeable screen means in the form of vertical bars uniformly spaced apart around the circumference. The bars forming said rigid cylindrical screen member are so held by internal hoop members bonded to the vertical bars at longitudinally spaced intervals of approximately equal distances. In one form a cylindrical pipe member of smaller diameter than the centerpipe screen member is enclosed within it so that the pipe is radially inwardly spaced from said screen member to form a coaxially annular space with the screen member. In one preferred form, an upper cap member is secured to the upper end of said centerpipe screen to close the top thereof. The socket member also holds said rigid cylindrical screen member vertical and coaxial with the walls of the radial reactor vessel.

Segments, or arcuate sections, of screens disconnectably attached to each other are placed adjacent the vessel sidewall to enclose a generally cylindrical bed of catalyst particles. Such segments likewise extend a desired distance above the centerpipe to assure that all of the permeable wall at the top of the centerpipe is covered by catalyst particles to a desired depth. The top of the catalyst bed supports a plurality of arcuate plates, or segments, to vertically confine the bed. Further, the vertical screen segments are radially spaced inwardly from the vessel sidewall to provide an annular flow path along the length and around the circumference of the catalyst bed so that reactant may flow more uniformly to or from the uniformly permeable centerpipe. In accordance with the present invention the centerpipe or screen segments, or both are restrained from vertical movement by rod means. Such rod means include at least one rod, or a plurality of removable rods, extending between the centerpipe cap and the upper end wall of the reactor vessel. The spacing of such rods, when affixed to the cap, from the upper end wall, as noted above, restrains axial movement of the centerpipe screen so that thermal expansion may occur without the lower end unseating from the support socket.

Similarly, rods extending between the screen segments and the upper end wall have sufficient clearance to permit thermal expansion, but prevent the screen sections from rising sufficiently to permit catalyst to expand into the annular space around the vessel side wall, thereby dropping catalyst level and potentially uncovering the upper end of the centerpipe. Such uncovering of the top of the centerpipe in turn would permit reaction fluids to bypass the catalyst bed and decrease reaction product yield.

Further objects and advantages of the present invention will become apparent from the following detailed description of the preferred embodiments taken in conjunction with the accompanying drawings which form an integral part of the present specification.

DETAILED DESCRIPTION OF THE PREFERRED EMBODIMENTS

Figure 1:
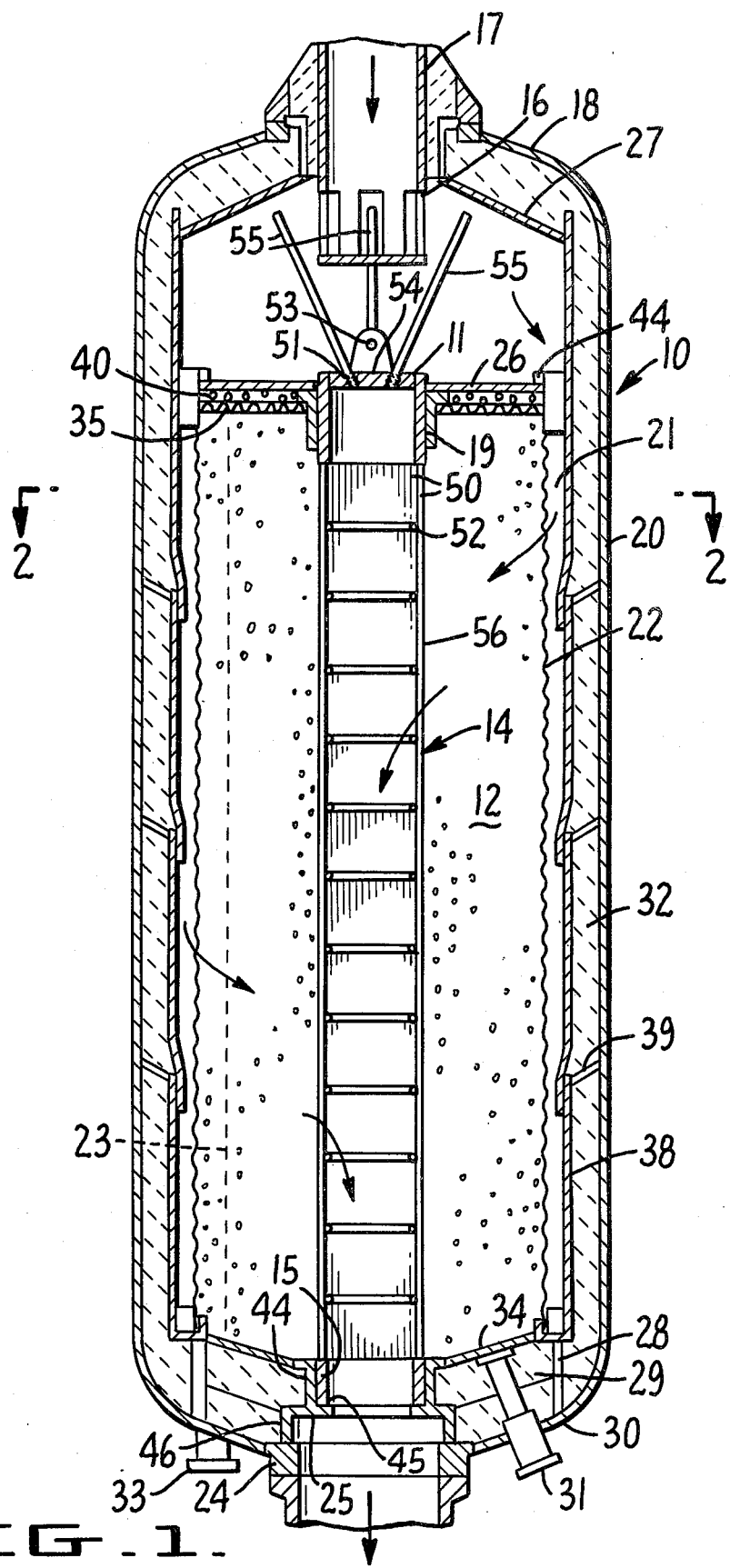
FIG. 1 is a vertical elevation view, partially in cross-section, of a radial reactor vessel suitable for performing the method of the present invention including a preferred embodiment of a uniformly permeable and rigid cylindrical screen member concentric with said vessel and having rod means for limiting axial lift of the centerpipe from its socket.

Referring now to FIG. 1, a radial flow reactor vessel 10 supports a generally cylindrical bed 12 of catalyst particles. A uniformly permeable cylindrical centerpipe, screen member 14, constructed in accordance with my invention, extends vertically and axially through bed 12. Flow of hydrocarbons to be processed in bed 12 (as indicated by arrows) is from inlet distributor 16 in an enlarged central inlet opening 17 designated as a "manway", through the upper end wall 18 of vessel 10, and into bed 12 from the annular space 21 between sidewall 20 of vessel 10 and the retaining screen means 22 for bed 12. Centerpipe screen means 14 preferably comprises an outer, uniformly permeable, screen member 56 extending from the vessel outlet formed by flange 24 on lower vessel end wall 30 toward upper vessel end wall 18. If desired, the permeability of screen member 56 may be increased at the top as compared to base end.

Figure 2:
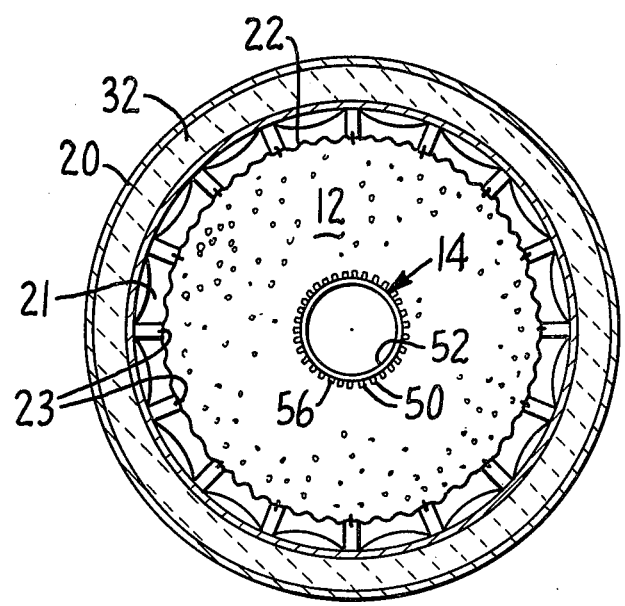
FIG. 2 is a cross-sectional plan view of the reaction vessel, centerpipe and screen segments taken in the direction of arrows 2—2 in FIG. 1.

Desirably the entire assembly of cylindrical centerpipe screen member 14, retainer screen means 22, formed by a plurality of arcuate segments 23 (best seen in FIG. 2), catalyst bed 12 and cover 26, formed by segments of a disc, is supported by gravity on lower end wall 30 of vessel 10. In the arrangement of FIG. 1, vertical support ring 28 provides a base for arcuate screen segments 23. Because vessel 10 in the present embodiment is intended to operate as a cold wall reactor, an internal shell 38 is also mounted on support ring 28 and is spaced from outer wall 20 by canted annular rings 39. Rings 39 are vertically spaced apart, and as with ring 28, are relatively thin compared to their length to form low thermal conductive paths between shell 38 and outer vessel side wall 20. The internal reaction volume of vessel 10 is insulated from upper wall 18 by a spacer such as annular disc 27. The bottom, side and top of vessel 10 is then filled with insulative cement or aggregate 32 to provide the necessary insulation. The upper portion 29 of bottom insulation is preferably coarse sand, covered with plate means 34, also formed in segments. Plate means 34 provides a base for catalyst bed 12.

As discussed above, it is essential that all portions of the internals (apart from the thermal insulation means) of vessel 10 be removable, as through manway 17 in upper end wall 18. For this reason cylindrical centerpipe screen member 14 must be removable. As will be apparent, the diameter of centerpipe screen 14 is somewhat exaggerated to illustrate its construction. However, the structure is such that its full diameter will readily pass through manway 17. To support centerpipe screen means 14 in a vertical position and substantially coaxial with vessel 10, a socket, or support seat 25 is supported within bottom outlet flange 24.

Socket 25 has a cylindrical sidewall 44 and an annular seat 45 for collar 15 formed integral with the lower end of rigid centerpipe screen 14. For low thermal conductivity support in flange 24, socket 25 also includes a mounting collar 46.

Desirably socket 25 is only long enough to support centerpipe 14 coaxially in vessel 10 during assembly. Although socket 25 may be tapered outwardly a few degrees to assist insertion and removal of centerpipe means 14, in general it is preferably cylindrical along its length, so that the outer surface of collar 15 frictionally engages wall 44 of socket 25. If centerpipe means 14 "creeps" upward under variable thermal conditions, or thermal cycling, restraint means, such as rods 55 removably secured to cap 11, prevent centerpipe 14 from rising sufficiently so that catalyst particles or fines enter socket 25 and accordingly, they do not reach the outlet stream flowing out through flange 24.

In the arrangemnent of FIG. 1, centerpipe 14 is closed at the top by cap member 11 which extends above the top of bed 12 and through cover 26. Segments forming catalyst bed cover 26 lie directly on a layer of spheres or balls 40 resting on screen 35 which closes off the top of bed 12. Since vertical movement of centerpipe means 14 would uncover the upper end of screen member 56 the side walls 19 of cap 11 are made sufficiently long so that reactant fluids will not by-pass bed 12 with accompanying loss of efficiency or degradation of products. Top 54 of cap 11 may be provided with a lift hook support 53 for use in installation or removal of centerpipe 14 through manway 17.

A significant advantage of the generally uniform cylindrical shape of screen 56 of centerpipe means 14 is to improve radial flow throughout bed 12. As shown, the parallel vertical bars 50 forming screen 56 are uniformly spaced and held by hoops 52 equally spaced along the length of screen 56. It has long been appreciated that radial flow vessels are subject to considerable variations in flow over various parts of the entire cylindrical body of catalyst particles. Under relatively low flow conditions and uniform permeability of the catalyst bed, catalytic reaction in such reactors is highly efficient. However, with high flow rates and non-uniform permeabilities, fluids "channel" or "stratify" through selected flow paths, generally those paths with the greatest permeability. To accommodate such variations, the width of bars 50 and their spacing from each other can be varied as they are assembled and welded on hoops 52.

In the present embodiment of the invention centerpipe 14 is restrained from rising within a predetermined maximum distance by one or more rods 55 threaded into holes 51 in cap 11. Preferably, holes 51 are canted to the axis of cap 11. The length of rods 55 is selected such that the distance between the ends of rods 55 and annular disc 27 does not exceed the predetermined distance that centerpipe member 14 may rise from seat 45 in socket 25 without loss of catalyst or bypassing of catalyst by hydrocarbon reactants. In this arrangement, cap member 11 is secured to the top of cylindrical screen section 56 by welding cylindrical side wall 19 to the ends of bars 15 forming screen 56.

Figure 3:
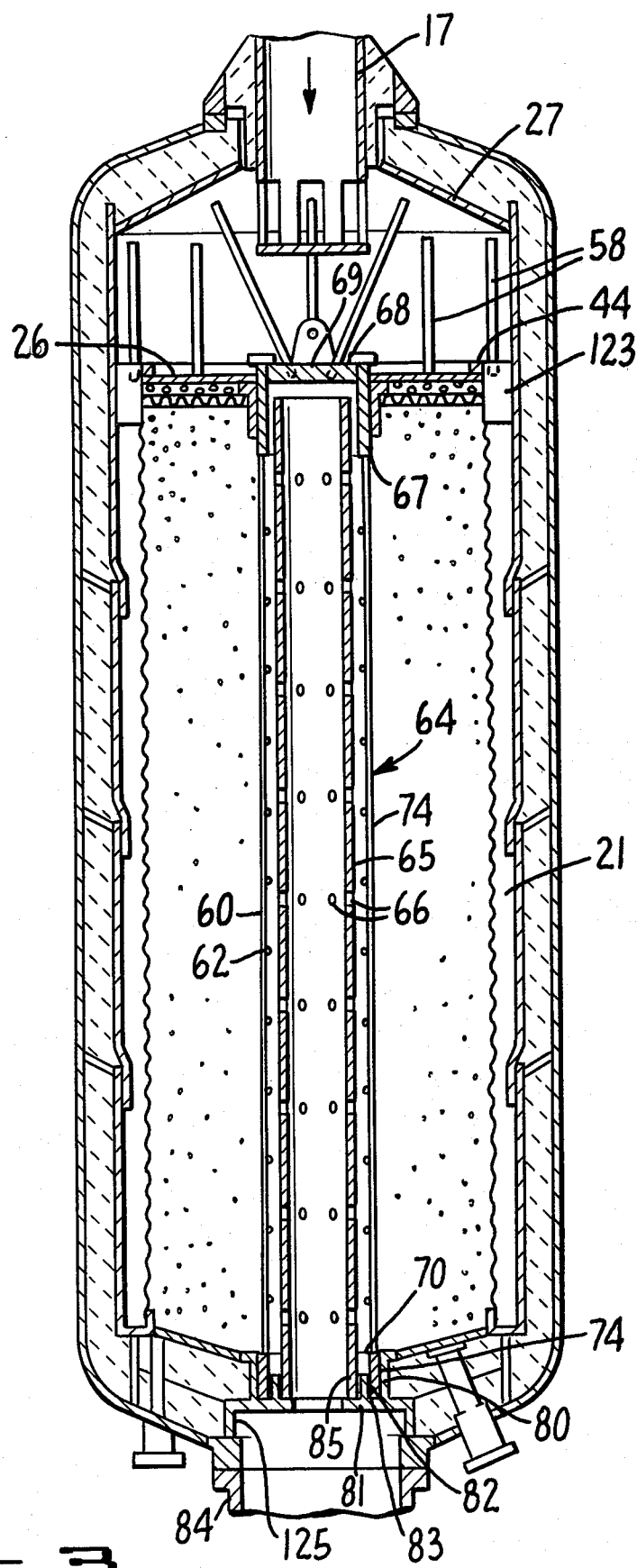
FIG. 3 is a vertical elevation view, partially in cross-section, of an alternative form of the present invention, including additional rod means for limiting axial lifting of the screen members and an alternate form of the centerpipe member, including a central perforated pipe.

FIG. 3 shows an alternative embodiment of the invention for restraining lift of centerpipe or screen ("scallops") 23 forming retaining bed 12. As there shown, centerpipe means 64 includes screen member 74 which encloses a smaller diameter pipe member 65 having slots, or holes, 66 formed therein to control flow of fluids throughout the cylindrical body of catalylst 12. As shown, pipe 65 terminates below the inner surface of cap 68 so that it is free to expand or contract without regard to movement of screen member 64.

Additionally, FIG. 3 shows means for restraining upward movement of screen segments, or "scallops", 23 either individually or collectively due to thermal cycling. As indicated rods 58 may be tapped into the top of each header section, such as 123. Clearance of the top end of rods 56 from disc 27 is sufficient only to permit easy installation and removal of rods 58.

In a preferred form, cylindrical screen 74 is a plurality of vertical bar members 60 equally spaced from each other and bonded to spaced apart hoop member 62, as by welding. For flow from annular space 21 to centerpipe 64, and to restrain catalyst movement with fluid flow, bars 60 are generally triangular in cross-section and arranged so that their wedge faces are directed inwardly to give greater clearance for flow than at the outer face of centerpipe means 64. A specific advantage in such construction is to prevent plugging by small particles that may bridge the open spaces between the external faces of bars 60. Hoops 62 are spaced apart at suitable intervals along the length of centerpipe screen 74 to give structural stability against the hydrostatic head of the catalyst bed at each level along centerpipe 64.

Sidewall 67 of cap member 68 is welded to the upper ends of rods 62 so that cover 69 is well above bed 12. Desirably perforated pipe 65 has a diameter substantially smaller than the inner diameter of screen member 74. The socket end of centerpipe 64 is in the form of a collar 70 secured to the ends of bars 60.

Although not shown, centerpipe member 64 may be formed as circular members, of the same diameters between base collar 70 and upper cap 68 to form the uniformly permeable centerpipe 64. The circular members are then secured in their axially spaced apart positions by radially spaced rods extending between base collar 70 and cap 68.

In the arrangement of FIG. 3, it will be noted that socket 125 includes a pair of concentric sidewalls 80 and 82 to accommodate both centerpipe screen collar 70 and lower end 85 of perforated pipe 65. Ring seat member 81 for pipe 65 is a radial extension of annular plate 83, formed as a part of socket member 125. Socket 125 is secured to the vessel so that it is concentric with outlet flange 84. Preferably, the lower end 85 of perforated pipe 65 has no openings below the top of socket sidewall 80.

While only the FIG. 3 embodiment of the invention includes a perforated pipe, such as 65, such a pipe may be included in the arrangement of FIG. 1.

In the arrangements of both FIGS. 1 and 3, if desired, screen member 56 (FIG. 1) or screen 74 (FIG. 3) may be made up of several cylindrical portions of bars 50 or 60 and hoops 52 or 62, respectively, with each portion having a decreasing diameter and secured end to end to form a stepped, generally conical centerpipe. Such an arrangement may also include a perforated internal pipe, if so desired.

It is frequently desirable to be able to easily remove the catalyst bed before attempting regeneration of catalyst, or other servicing of reactor 10. For example in FIG. 1, catalyst particles may be drained through flange 31 which penetrates through bottom plate 34. Additionally flange 33 may be used to extract samples of catalyst particles during normal operation, as well as to assist in removing catalyst bed particles. After removal of the catalyst, the individual internal elements may be removed, (or installed). As shown, to assist in removal or installation of centerpipe member 14, a lifting lug or eye 53 is secured to upper end 11 (FIG. 1) or plate 69 (FIG. 3). Ring 44 holds the segments of cover 26 in place on balls 40 over screen 35.

The present embodiments of the invention have been described in connection with flow of hydrocarbons to be reacted into vessel 10 through flow distributor 16 and with effluent exiting through outlet 24. However, reverse flow into centerpipe member 14 and then radially outwardly through bed 12 to annular space 22 is possible with all of the advantages of such centerpipe being retained against thermal movement to the extent required while preventing movement of catalyst from bed 12 into the space between the centerpipe and its socket seat.

Figure 4:
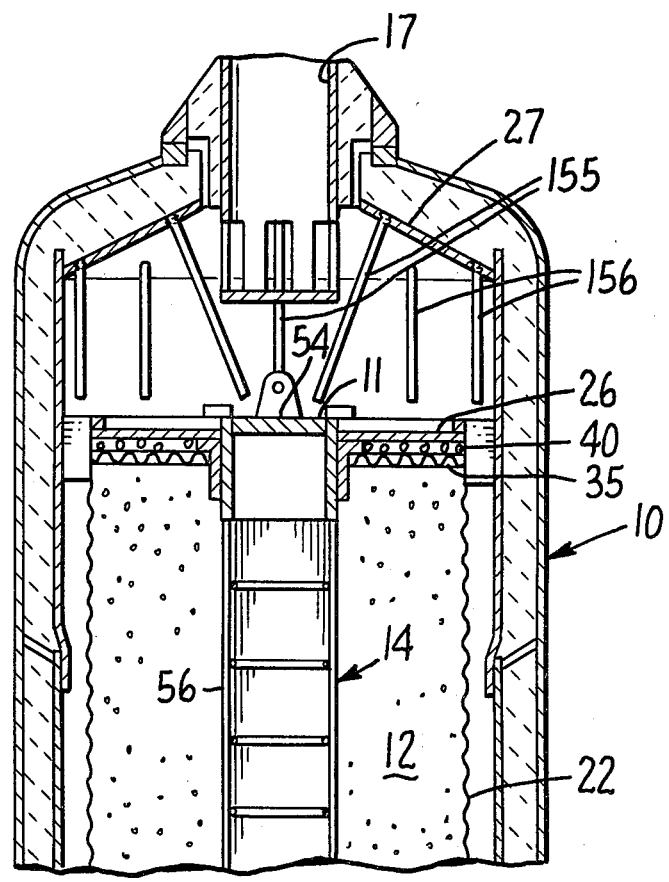
FIG. 4 is a cross-sectional elevation view of a vessel showing another embodiment of the invention including an altenate arrangement for supporting the restraint means from the upper end wall of the vessel.

FIG. 4 illustrates a further alternate embodiment of the present invention which is particularly useful for restraining vertical movement of both the centerpipe, such as 14 in FIG. 1, and screen segments 23. As shown rods 155 may be installed in upper disc 27 with the opposite ends of rods 155 spaced a predetermined distance from top 54 of cap 11. Similarly, rods 156 for restraining the extent or vertical lift of screen segments 23 may be tapped into disc 27.

Rods 155 and 156, of course, are sufficiently rigid to prevent their possible buckling under the axial lifting force on centerpipe member 14 or screen segment 23, respectively. However, the deformation strength of these rods is less than the deformation strength of the upper inner surface, such as upper disc 27.

Reinforcing pads may be added to disc 27 to resist forces applied by rods 55 (FIG. 1) or rods 155 and 156 (FIG. 3) if desired.

While only a few examples of the preferred embodiments of the invention have been shown and described, various other modifications or changes in both the method and apparatus will occur to those skilled in the art. All such modifications or changes coming within the scope of the appended claims are intended to be included therein.

I claim:

1. Method of assembling a hydroprocessing reactor wherein an axially elongated reactor vessel includes an internal structure permitting radial flow between the central portion of said vessel and the axially elongated sidewall of said vessel, said internal structure being formed by a plurality of elements, each of which is insertable or removable through an access opening in the upper wall of said vessel and each of said internal structure elements being supported by gravity on the lower end wall of said vessel, which comprises positioning a centralized socket member to communicate with a flow passageway through said lower end wall of said vessel, seating the lower end of a centerpipe member in said socket member to centralize said centerpipe in said vessel and to extend it axially parallel to a substantial portion of the length of said sidewall, said centerpipe being formed to include over its length a constant diameter external screen member, said external screen member having a surface uniformly permeable for fluid flow therethrough, enclosing said centerpipe screen member within a body of catalyst particles extending outwardly from said screen member, externally confining said particles adjacent said vessel sidewall with a plurality of elongated screen segments to form an annular vertical passageway between said vessel sidewall and the so formed cylindrical body of said catalyst particles to permit radial flow of reacting fluids through said screen segments and said body to said centerpipe screen member, and permitting said gravity supported centerpipe member to axially lift from said socket member to a predetermined, limited extent upwardly due to thermal cycling of said catalyst particles and/or said vessel internal elements, and interposing restraint means between the top of said centerpipe member and the upper end of said vessel to prevent further upward lifting of the centerpipe member beyond said predetermined extent such that the lower end of the centerpipe member does not lift sufficiently to unseat the lower end of the centerpipe member from the socket during normal operation of the reactor.

2. The method in accordance with claim 1 wherein said centerpipe includes a perforated pipe member enclosed within said screen member and said perforated pipe is separately supported in said socket member.

3. The method in accordance with claim 1 or 2 wherein said restraint means comprises at least one rod member supported on the upper end of said centerpipe member.

4. The method of claim 1 or 2 wherein said restraint means comprises at least one rod member supported from the upper end of said vessel and extending downwardly to a position adjacent the upper end of said centerpipe.

5. The method of claim 1 or 2 with the addition of further restraint means between the upper ends of said screen segments and said upper end of said vessel.

6. The method of claim 5 in which said further restraint means comprises rod members, each supported by at least some of said screen segments.

7. The method of claim 5 in which said further restraint means comprises rod members supported at the upper end of said vessel and extending downwardly to a position adjacent the upper end of at least some of said screen segments.

8. A radial flow reactor for flowing fluid to be reacted with a solid contact material comprising:
   a vertically elongated vessel having fluid inlet and outlet passageways formed therein;
   a vertically elongated centerpipe member, having flow paths formed therethrough, said centerpipe member being vertically movable relative to said vessel;
   means for retaining said solid contact material in a generally cylindrical body around said centerpipe member, said means for retaining being a plurality of elongated arcuate screen members arranged around the periphery of said vessel and axially generally coextensive with said centerpipe member;
   socket means for independently seating said centerpipe member therein by gravity for vertical insertion or removal of said centerpipe member relative to said vessel;
   means for supporting said socket on a lower wall of said vertically elongated vessel; and
   restraint means for preventing further axial lifting of said gravity seated centerpipe member due to thermal cycling of the solid contact material and/or the internal structure of the vessel relative to said socket after permitting upward axial movement of the centerpipe member to a predetermined, limited extent such that the lower end of the centerpipe member does not unseat from the socket during normal operation of the reactor.

9. A radial flow reactor in accordance with claim 8 wherein the centerpipe member includes a screen member and a perforated pipe member enclosed within said screen member, said perforated pipe member extending axially over a substantial portion of the length of said screen member, and said socket means includes means for seating said perforated pipe member independently of said screen member.

10. The radial flow reactor of claim 8 or 9 wherein said centerpipe member includes an upper cap member and said restraint means comprises at least one rod secured to said upper cap member, and said at least one rod extends toward an upper inside surface portion of said vessel and to within a distance less than said predetermined distance.

11. The radial flow reactor of claim 10, wherein the deformation strength of said rods is less than the deformation strength of the upper inner surface portion of said vessel.

12. The radial flow reactor of claim 8 or 9, wherein said restraint includes rod means supported by said vessel and the distance between the end of said rod means and said centerpipe member is less than said predetermined distance.

13. The radial flow reactor of claim 8 or 9 including lift restricting means between the upper inner portion of said vessel and said retaining screen members.

14. The radial flow reactor of claim 13 in which said lift restricting means comprises rod members supported by at least some of said retaining screen members.

15. The radial flow reactor of claim 13 in which said lift restricting means comprises rod members suppported by said vessel extending toward the upper ends of at least some of said retaining screen members.

* * * * *